(12) United States Patent
Arai

(10) Patent No.: US 8,644,612 B2
(45) Date of Patent: Feb. 4, 2014

(54) INFORMATION PROCESSING APPARATUS AND LOCUS DATA RECOGNITION METHOD

(75) Inventor: Tsunekazu Arai, Tama (JP)

(73) Assignee: Canon Kabushiki Kaisha, Tokyo (JP)

( * ) Notice: Subject to any disclaimer, the term of this patent is extended or adjusted under 35 U.S.C. 154(b) by 592 days.

(21) Appl. No.: 12/642,703

(22) Filed: Dec. 18, 2009

(65) Prior Publication Data

US 2010/0166313 A1    Jul. 1, 2010

(30) Foreign Application Priority Data

Dec. 26, 2008    (JP) ................................ 2008-334758

(51) Int. Cl.
*G06K 9/46*      (2006.01)
*G06F 3/033*     (2006.01)

(52) U.S. Cl.
USPC ............ 382/187; 382/190; 382/203; 715/863

(58) Field of Classification Search
USPC ......... 382/100, 181, 187, 189, 309, 311, 188, 382/186, 190, 195, 202, 209, 182, 115, 119, 382/121, 312, 321, 313, 314, 203; 345/156, 345/173, 179; 715/700, 863, 200, 221, 222, 715/224, 201, 273
See application file for complete search history.

(56) References Cited

U.S. PATENT DOCUMENTS

| 5,426,711 | A | * | 6/1995 | Kitamura ...................... 382/187 |
| 5,781,663 | A |   | 7/1998 | Sakaguchi et al. |
| 5,812,697 | A | * | 9/1998 | Sakai et al. .................... 382/186 |
| 6,282,316 | B1 | * | 8/2001 | Arai ............................... 382/187 |
| 6,408,091 | B1 |   | 6/2002 | Sakaguchi et al. |
| 6,765,559 | B2 | * | 7/2004 | Hayakawa ..................... 345/173 |

FOREIGN PATENT DOCUMENTS

| JP | 6-208654 A | 7/1994 |
| JP | 8-305821 A | 11/1996 |
| JP | 3416268 B2 | 6/2003 |
| JP | 2004-213521 A | 7/2004 |
| JP | 2008-052372 A | 3/2008 |

* cited by examiner

Primary Examiner — Sheela Chawan
(74) Attorney, Agent, or Firm — Canon USA Inc. IP Division

(57) ABSTRACT

An information processing apparatus includes a gesture locus data recognition unit configured to execute processing for recognizing gesture locus data included in locus data according to characteristic data of the locus data and gesture characteristic shape data included in gesture dictionary data and output a result of the processing, a separation unit configured to separate gesture locus data and locus data other than the gesture locus data from the locus data according to the result of the recognition by the gesture locus data recognition unit, and a character locus data recognition unit configured to execute processing for recognizing locus data of a character included in the locus data other than the gesture locus data according to the characteristic data of the locus data other than the gesture locus data which is separated by the separation unit, and the locus characteristic data of a character included in a character dictionary data, and output a result of the processing.

9 Claims, 18 Drawing Sheets

FIG.4
| GESTURE CODE | GESTURE CHARACTERISTIC SHAPE | GESTURE PARAMETER CONDITION | GESTURE SEPARATION CONDITION | COMMAND TYPE |
|---|---|---|---|---|
| 0001 | 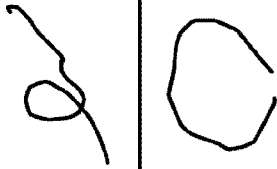 | ONE-DIGIT NUMBER | MATCHING DEGREE: 60% OR HIGHER | undo |
| 0002 | 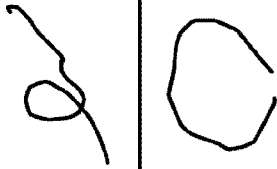 | NUMBER UP TO TWO DIGITS | MATCHING DEGREE: 80% OR HIGHER | PRINT |
| 0003 | 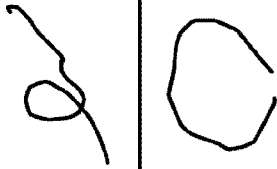 | TWO-BYTE ALPHANUMERICS | MATCHING DEGREE: 80% OR HIGHER | PRINTING SIZE |
| 0004 | 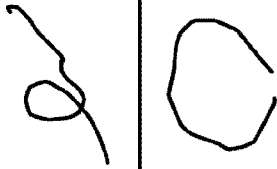 | NUMBER UP TO TWO DIGITS | MATCHING DEGREE: 60% OR HIGHER | DELETE |
| ... | ... | ... | ... | ... |

FIG.13

| GESTURE CODE | GESTURE CHARACTERISTIC SHAPE | GESTURE PARAMETER CONDITION | GESTURE SEPARATION CONDITION | COMMAND TYPE | POSITIONAL CONDITION |
|---|---|---|---|---|---|
| 0001 |  | ONE-DIGIT NUMBER | MATCHING DEGREE: 60% OR HIGHER | undo | CHARACTER LOCUS SHOULD BE WRITTEN OUTSIDE GESTURE LOCUS |
| 0002 |  | NUMBER UP TO TWO DIGITS | MATCHING DEGREE: 80% OR HIGHER | PRINT | CHARACTER LOCUS SHOULD BE WRITTEN INSIDE GESTURE LOCUS |
| 0003 |  | TWO-BYTE ALPHANUMERICS | MATCHING DEGREE: 80% OR HIGHER | PRINTING SIZE | CHARACTER LOCUS SHOULD BE WRITTEN INSIDE GESTURE LOCUS |
| 0004 |  | NUMBER UP TO TWO DIGITS | MATCHING DEGREE: 60% OR HIGHER | DELETE | CHARACTER LOCUS SHOULD BE WRITTEN OUTSIDE GESTURE LOCUS |
| ... | ... | ... | ... | ... | ... |

INFORMATION PROCESSING APPARATUS AND LOCUS DATA RECOGNITION METHOD

BACKGROUND OF THE INVENTION

1. Field of the Invention

The present invention relates to an information processing apparatus and a locus data recognition method.

2. Description of the Related Art

A conventional device having an input unit, such as a touch panel, extracts locus data of one character input in an input frame (field) or by various character separation methods. Furthermore, such a conventional device executes character recognition in a unit of one character by using the extracted locus data as input data in the character recognition processing.

In this case, it is assumed that the locus data does not include locus data other than the one included in the recognition target character. In other words, in character recognition processing, only recognition of a character is executed. Furthermore, in gesture recognition, only recognition of a gesture is executed during gesture recognition processing.

However, a pen-input graphic editing system discussed in Japanese Patent Application Laid-Open No. 06-208654 does not consider that an editing request and a character are input at the same time. Accordingly, the conventional method separately determines whether specific input data is an editing request or a character.

In the pen-input graphic editing system discussed in Japanese Patent Application Laid-Open No. 06-208654, if the size and the position of input data is not clear, it is not certain whether the input data is determined to be an editing request or a character. In addition, in the pen-input graphic editing system discussed in the Laid-Open No. 06-208654, even if an editing request is correctly recognized, a subsequent character is likely to be misrecognized.

In addition, a data processing apparatus discussed in Japanese Patent Application Laid-Open No. 08-305821 can extract only a predetermined locus. Accordingly, the data processing apparatus discussed in the Laid-Open No. 08-305821 can correctly recognize input data only when a gesture and a character are input in a predetermined input order. But if the order of inputting a gesture or a character is not determined or used, the irregularly input gesture or character cannot be effectively recognized.

In addition, in an image recognition apparatus disclosed in U.S. Pat. No. 5,781,663, a gesture recognition unit, a character recognition unit, and a graphic recognition unit recognize input loci and merely selects a best result from a plurality of recognition results.

Therefore, the image recognition apparatus disclosed in U.S. Pat. No. 5,781,663 does not consider a method for separating a gesture and a character which are mixed in loci.

An optimal result can be output by executing recognition processing on all locus combinations by using a combination of conventional recognition units, such as a gesture recognition unit and a character recognition unit. However, in this case, it is necessary to execute recognition processing on a large number of combinations. Accordingly, the recognition cannot be completed in a practical calculation time.

In addition, in the above-described conventional method, an incorrect combination may match a dictionary pattern. In this case, misrecognition may occur. Accordingly, the above-described conventional method is not practical. Furthermore, in the above-described conventional method, a separated recognition result may be obtained by a combination in which a specific locus is included in both separated data.

If data is input as a sentence, the above-described conventional method can separate each character. However, if a gesture and a character are mixed and included in input data, a conventional method that uses a conventional separation algorithm is not appropriate and cannot separate mixed gestures and characters.

For example, if a control command parameter is written within a gesture locus having a circular shape ("○"), the above-described conventional method cannot appropriately recognize the parameter by recognizing that the gesture locus and the parameter constitute one character.

In addition, when a control command parameter is written within a frame (field) of a circumscribed rectangle of the input gesture locus, if the input data is separated into a locus of the gesture and a part of the input character, and a locus of the other characters, the above-described conventional method cannot recognize both locus data.

SUMMARY OF THE INVENTION

The present invention is directed to a method for correctly separating a gesture locus and a character locus from mixed loci including a gesture locus and a character locus within a practical processing time.

According to an aspect of the present invention, an information processing apparatus includes a gesture locus data recognition unit configured to execute processing for recognizing gesture locus data included in locus data according to characteristic data of the locus data and gesture characteristic shape data included in gesture dictionary data and output a result of the processing, a separation unit configured to separate gesture locus data and locus data other than the gesture locus data from the locus data according to the result of the recognition by the gesture locus data recognition unit, and a character locus data recognition unit configured to execute processing for recognizing locus data of a character included in the locus data other than the gesture locus data according to the characteristic data of the locus data other than the gesture locus data which is separated by the separation unit and the locus characteristic data of a character included in a character dictionary data, and output a result of the processing.

An exemplary embodiment having the above-described configuration can correctly separate a gesture locus and a character locus from loci in which a gesture locus and a character locus are mixed, within a practical processing time.

In addition, the present invention can be implemented by a locus data recognition method, a program for the locus data recognition method, and a storage medium storing the program.

According to yet another aspect of the present invention, an information processing apparatus is capable of increasing a character locus separation ratio and a character locus recognition ratio by restricting an input character locus according to a relationship between a gesture locus and a character locus accompanying the gesture locus. In addition, according to yet another aspect of the present invention, an information processing apparatus can separate a gesture locus and a character locus from loci having the same shape according to a setting of a condition for a relative positional relationship.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIG. 4 illustrates an example structure of data of a gesture dictionary (case 1).

FIG. 13 illustrates an example of a structure of data of a gesture dictionary (case 2).

DESCRIPTION OF THE EMBODIMENTS

Various exemplary embodiments, features, and aspects of the invention will be described in detail below with reference to the drawings.

Now, a first exemplary embodiment of the present invention will be described below with reference to drawings.

Figure 1:
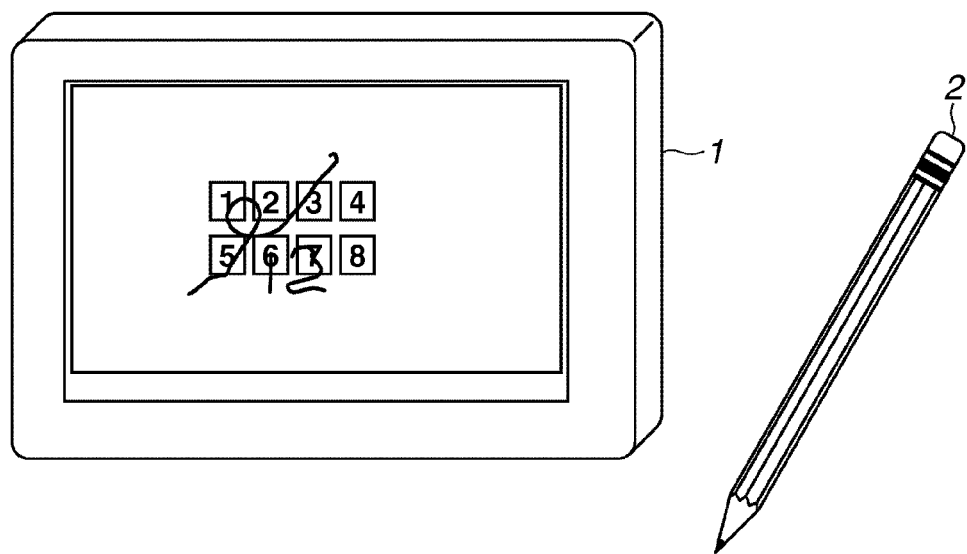
FIG. 1 illustrates an exemplary system configuration according to an exemplary embodiment of the present invention.

FIG. 1 illustrates an exemplary system configuration of a system according to the present exemplary embodiment. Referring to FIG. 1, software for displaying a still image recorded on a recording medium is installed on an information terminal 1, which is an example of an information processing apparatus.

When a user inputs a hand-drawn locus on a liquid crystal display (LCD) device 7 of the information terminal 1 by using an instruction input device 6, a locus is displayed on an image displayed on the LCD 7 of the information terminal 1. The instruction input device 6 will be described below. A pen 2 is a pen used for a general transparent resistance film digitizer.

Figure 2:
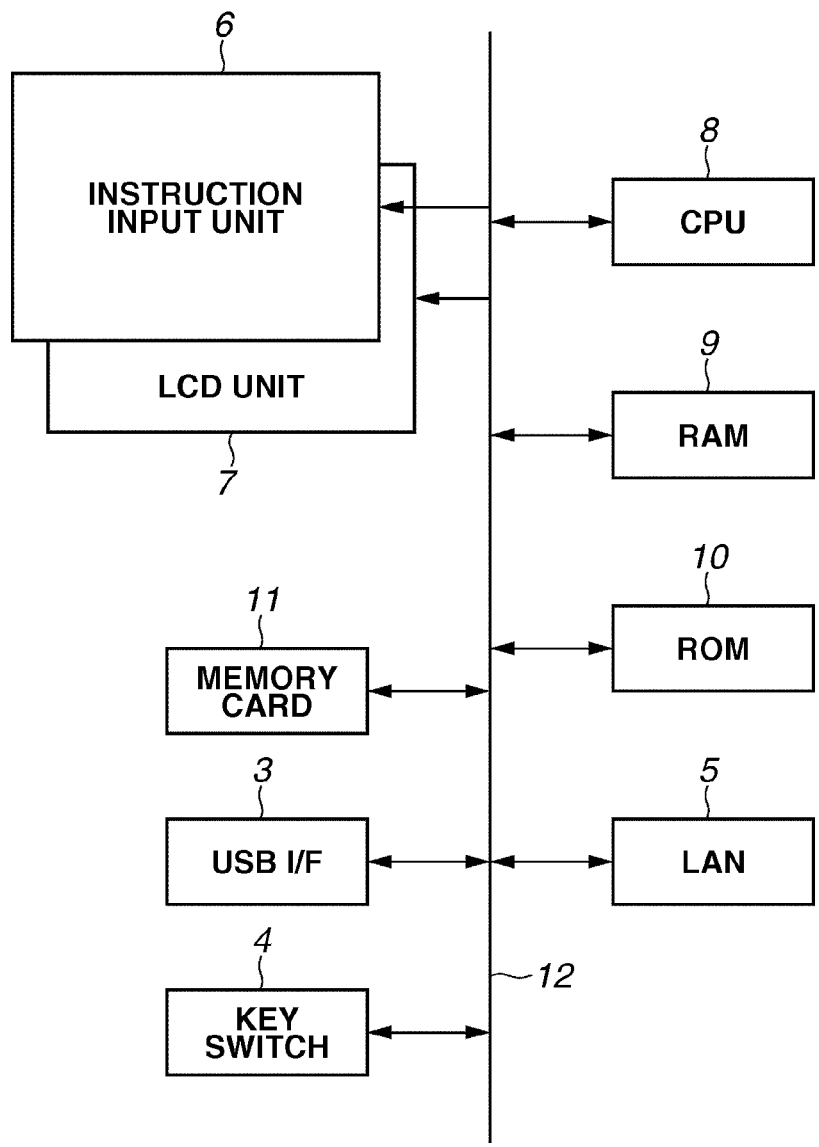
FIG. 2 illustrates an exemplary hardware configuration of an information terminal 1.

FIG. 2 illustrates an exemplary hardware configuration of the information terminal 1. Referring to FIG. 2, a universal serial bus (USB) interface 3 is an interface connected with other apparatuses. Data communication can be executed between the information terminal 1 and other apparatuses via the USB interface 3.

When a user presses a switch provided on the device, a key switch 4 detects the pressing of the switch and notifies the result of the detection to a central processing unit (CPU) 8.

Data communication with other apparatus on a network can be executed via a local area network (LAN) interface (I/F) 5.

The instruction input device 6 includes a transparent resistance film digitizer and is a device for inputting positional coordinates. When the user presses the surface of the instruction input device 6 with the pen 2 (FIG. 1), the instruction input device 6 transmits X-axis and Y-axis positional coordinate data of the pressed position to the CPU 8 via a system bus 12.

The LCD device 7 includes an LCD device, an LCD control circuit, and a display memory. The LCD device 7 is connected to the CPU 8 via the system bus 12. The LCD device 7 displays a locus and a character according to an instruction from the CPU 8.

The CPU 8 is connected to a random access memory (RAM) 9, a read-only memory (ROM) 10, and the LCD device 7 via the system bus 12. The CPU 8 executes recognition processing according to a program stored on the ROM 10. The program will be described below.

The RAM 9 functions as a work area for the CPU 8. the ROM 10 stores a program of the recognition processing according to the present exemplary embodiment and a dictionary, which will be described below.

The memory card 11 stores image information, for example. The system bus 12 is a data bus used for data communication among the CPU 8, the RAM 9, the ROM 10, and other components of the information terminal 1.

Figure 3:
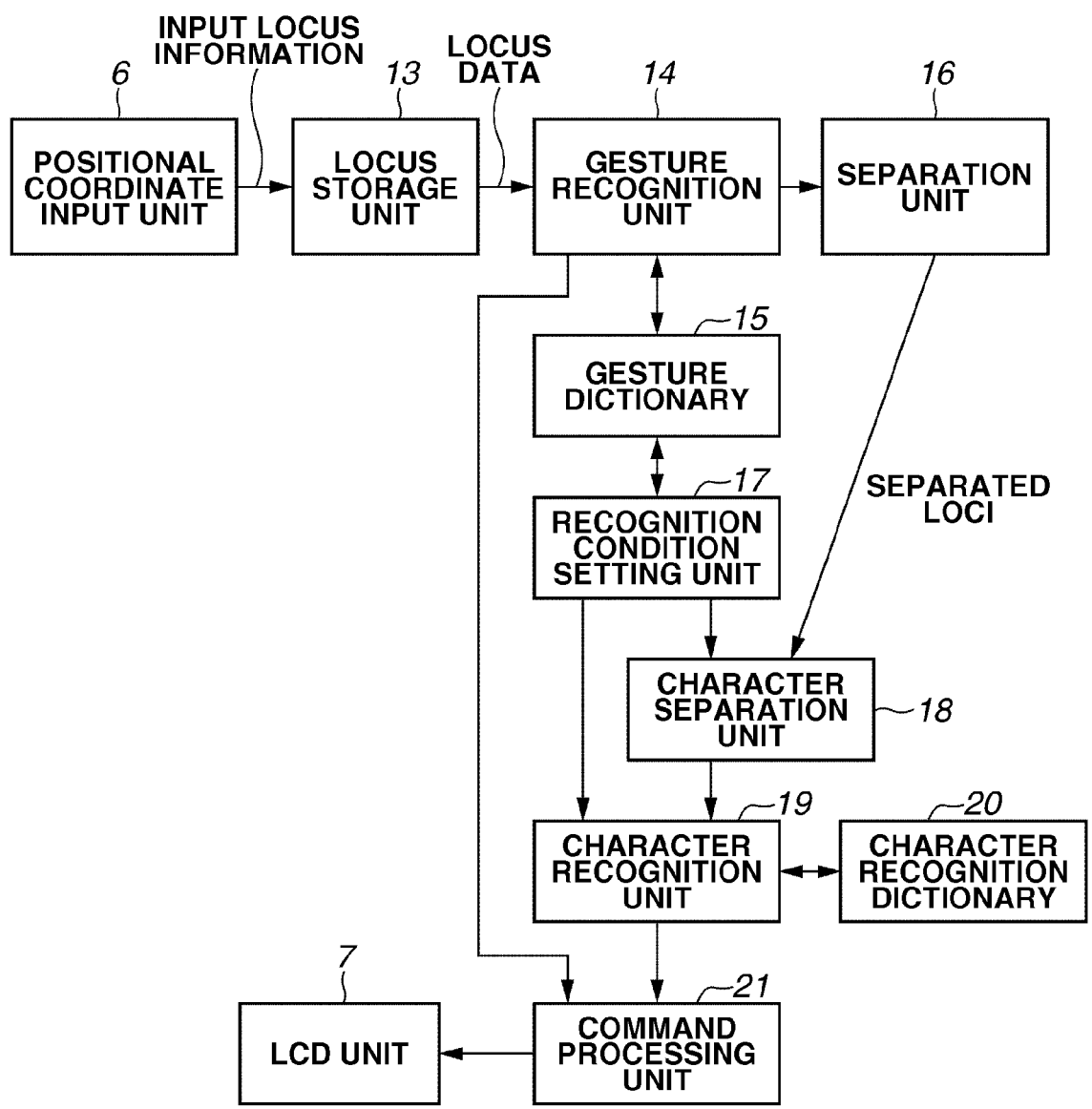
FIG. 3 illustrates an exemplary functional configuration of the information terminal 1 (case 1).

FIG. 3 illustrates an exemplary functional configuration of the information terminal 1 (case 1).

Each of components of the information terminal 1, such as a gesture recognition unit 14, a separation unit 16, a recognition condition setting unit 17, a character separation unit 18, a character recognition unit 19, and a command processing unit 21, can be implemented by the CPU 8 by executing a program stored on the ROM 10.

As described above, the instruction input device 6 detects positional coordinate data, such as a locus written with the pen 2, and inputs the detected positional coordinate data to the CPU 8 as a locus. The input locus is stored on a specific area (a locus storage unit 13, which will be described in detail below) of the RAM 9 under control of the CPU 8.

The locus storage unit 13 records positional coordinate data rows of the input locus in a unit of a locus. The gesture recognition unit 14 acquires locus data (positional coordinate data rows of the locus) from the locus storage unit 13.

The gesture recognition unit 14 extracts characteristic data of the acquired locus from the positional coordinate data row of the acquired locus. In addition, the gesture recognition unit 14 executes matching processing for comparing the extracted characteristic data and data of the gesture dictionary 15 (for example, a gesture characteristic shape).

The gesture recognition unit 14 outputs a recognition result, such as a gesture code (a code indicating the shape of the gesture) of a gesture characteristic shape most similar to the extracted characteristic data (gesture characteristic shape data) or a command type.

The gesture dictionary 15 is dictionary data including a gesture code, a gesture characteristic shape (locus characteristic shape), and a gesture parameter condition of a registered gesture. The separation unit 16 separates a gesture locus (gesture locus data) from the other loci (the other locus data). More specifically, if a gesture locus and a character locus are input to the separation unit 16 at the same time, the separation unit 16 separates the loci from each other according to a result of recognition by the gesture recognition unit 14.

The recognition condition setting unit 17 sets the number of characters to the character separation unit 18 according to the gesture parameter condition described in the gesture dictionary 15. The character separation unit 18 separates character loci, which are transmitted from the separation unit 16, into locus data of one character one by one up to the number of characters transmitted from the recognition condition setting unit 17.

The character recognition unit 19 executes matching between the characteristic data of the locus data of one character, which is transmitted from the character separation unit 18, and locus characteristic data of a character stored in the character recognition dictionary 20, which is an example of a character dictionary data.

The character recognition unit 19 outputs the character code of the character of the locus data whose matching degree is the highest, as a recognition result.

The command processing unit 21 executes processing related to the command (the display and setting of the printing size "A4", for example) according to the command type transmitted from the gesture recognition unit 14 and the gesture command parameter indicated by the character code transmitted from the character recognition unit 19.

In addition, triggered by an instruction to display the locus from the gesture recognition unit 14, the command processing unit 21 displays a locus or a recognition result on the LCD device 7.

FIG. 4 illustrates an example of a structure of data of a gesture dictionary (case 1). Referring to FIG. 4, one piece of gesture dictionary data includes a gesture code, a gesture characteristic shape (characteristic data of the gesture shape), a gesture parameter condition, a gesture separation condition, and a command type.

As a registered gesture characteristic shape, data drawn in a unique way having a shape different from that of one stroke constituting a normal character, such as an alphanumeric, a kana character (a Japanese phonetic syllabary), or a kanji character (a Chinese character), is registered.

For example, a gesture code "0002", which is a gesture code for executing printing, includes a circular locus and a numeral for designating the number of prints. A gesture code "0002" is written starting from a point different from the starting point of writing a normal numeral "0".

If the user writes the gesture "0002" and a numeral "3" with the pen 2, then the information terminal 1 recognizes that an instruction to "print on three sheets" has been given. Furthermore, if the user writes the gesture "0002" and a numeral "11" with the pen 2, then the information terminal 1 recognizes that an instruction to "print on eleven sheets" has been given.

In the present exemplary embodiment, only gesture loci are registered in the gesture dictionary. However, it is also useful if a locus constituting a gesture locus and a character, e.g., "/−3", is registered in the gesture dictionary.

With the above-described configuration, the information terminal 1 sets a character locus code, which indicates a character locus, as a recognition result.

Figure 5:
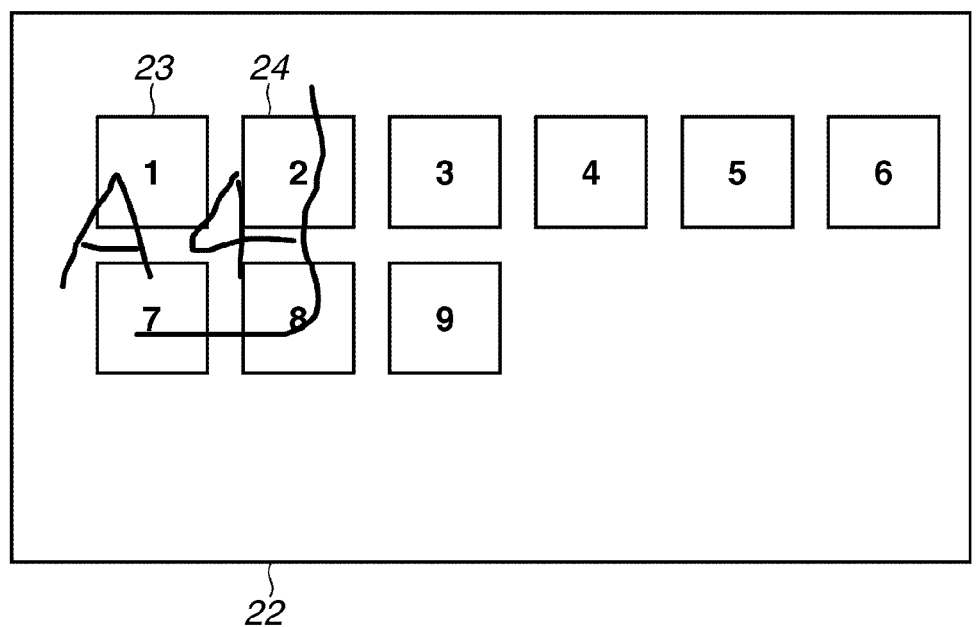
FIG. 5 illustrates an example of a locus of input data (case 1).

FIG. 5 illustrates an example of a locus of input data (case 1). Referring to FIG. 5, still images 23 and 24, which are displayed as a reduced rectangle in FIG. 5, are displayed on a display input screen 22.

Figure 6:
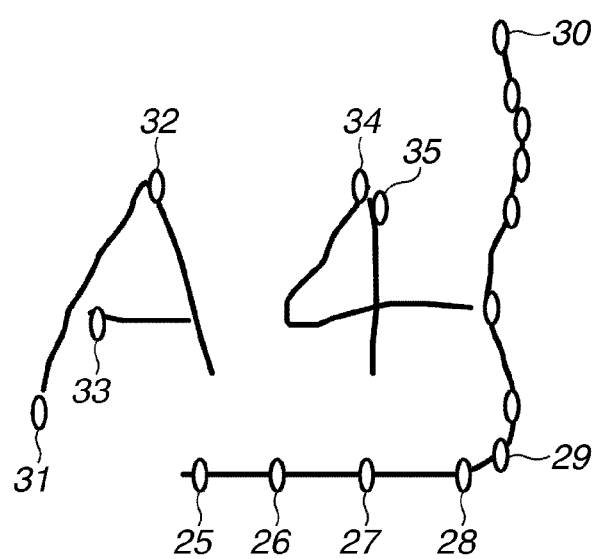
FIG. 6 illustrates an example of locus data (case 1).

FIG. 6 illustrates an example of locus data (case 1). Referring to FIG. 6, the user inputs a gesture and a character starting from a first stroke starting point 25 and via a first stroke second point 26 and a first stroke end point 30. In addition, the user inputs the gesture and the character by performing a second stroke, which starts from a starting point 31, a third stroke, which starts from a starting point 32, a fourth stroke, which starts from a starting point 33, a fifth stroke, which starts from a starting point 34, and a sixth stroke, which starts from a starting point 35.

Figure 7:
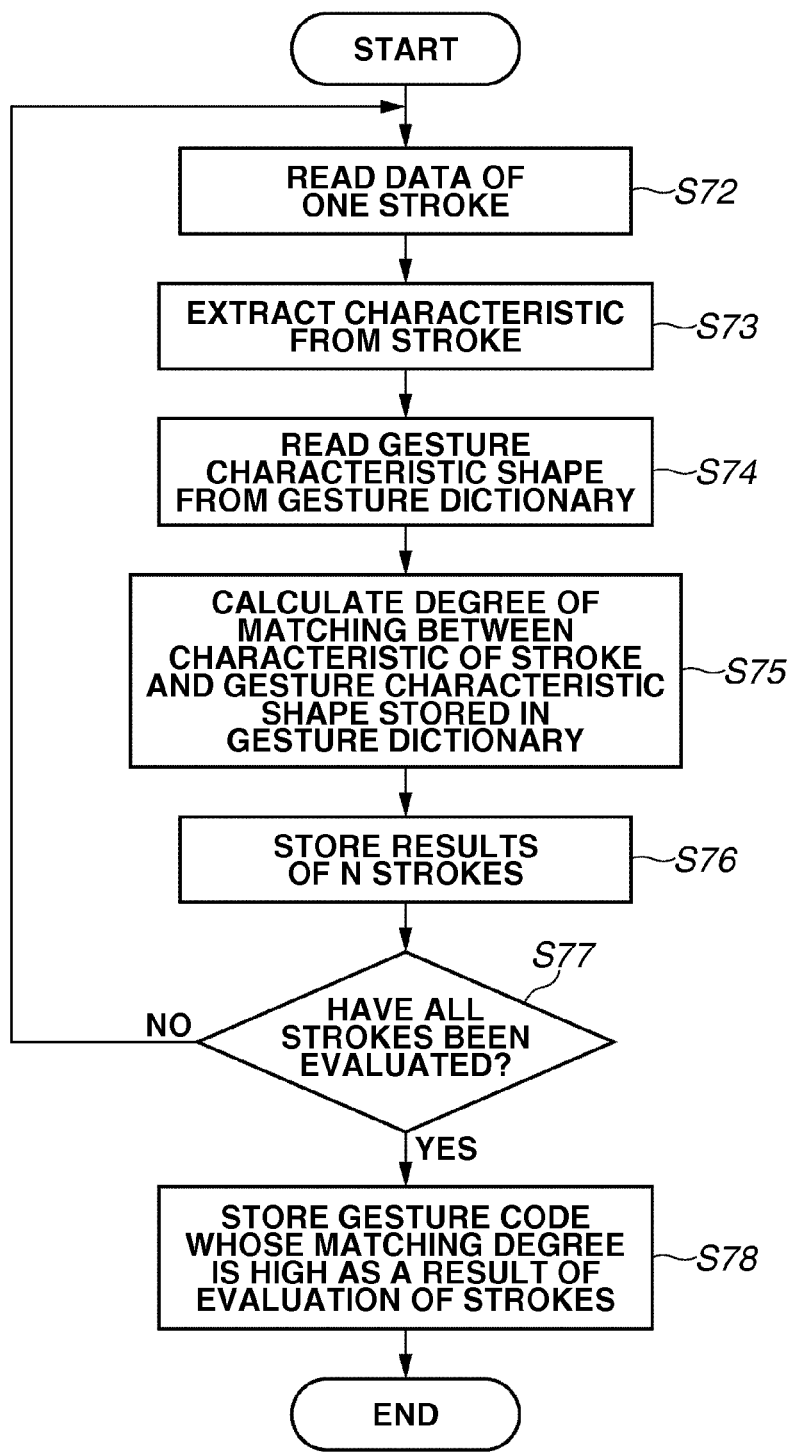
FIG. 7 is a flow chart illustrating an example of gesture recognition processing.

FIG. 7 is a flow chart illustrating an example of gesture recognition processing (processing for recognizing gesture locus data). When a gesture locus and a character locus, which is a gesture command parameter, have been completely input, the processing in the flowchart of FIG. 7 starts. A processing method for executing recognition every time a locus is input is also feasible. However, for sake of simplicity, in the present exemplary embodiment, the processing in the flowchart of FIG. 7 starts after all loci are completely input.

If a predetermined length of time has passed or if the user presses an area outside the input area, after the user has input loci, the processing described below starts. More specifically, when the loci 25 through 35 illustrated in FIG. 6 are input, the processing illustrated in FIG. 7 starts.

After the gesture recognition processing has started, the gesture recognition unit 14 secures a work area. Furthermore, the CPU 8 initializes the work area and loads positional coordinate data rows of all the input loci thereon.

The input loci are normalized to a coordinate range having the same value as that at the time of generating the dictionary. For example, the input loci are normalized to the range of 0 to 100.

In step S72, the gesture recognition unit 14 reads data of one locus (one stroke). In the example illustrated in FIG. 6, the gesture recognition unit 14 reads the locus data 25 through 30 of the first stroke into a storage buffer.

In step S73, the gesture recognition unit 14 executes locus characteristic extraction processing. For example, the gesture recognition unit 14 divides a locus into ten equal parts and outputs positional coordinate points thereof as characteristic points.

In step S74, the gesture recognition unit 14 reads the gesture characteristic shape from the gesture dictionary 15. More specifically, at first, the gesture recognition unit 14 reads positional coordinates of the gesture characteristic shape of the gesture "0001". Then, the gesture recognition unit 14 reads the gesture characteristic shapes of the gestures "0002", "0003", and "0004".

In step S75, the gesture recognition unit 14 executes processing for calculating a matching degree of characteristic data of the locus and the data of the gesture characteristic shape stored in the gesture dictionary 15.

More specifically, If all of the positional coordinate points, which have been obtained by equally dividing the normalized locus into ten parts, and positional coordinate points of the gesture characteristic shape registered in the gesture dictionary 15 are the same, then the gesture recognition unit 14 determines that the matching degree is 100%.

For example, the gesture recognition unit 14 determines that the points 25 through 30 of the first stroke of the locus illustrated in FIG. 6 has a matching degree of 90% with the gesture code "0003" registered in the gesture dictionary 15.

The gesture recognition unit 14 determines that no gesture characteristic shape corresponding to the subsequent locus 31 has been registered in the gesture dictionary 15.

In step S76, the gesture recognition unit 14 stores the recognition result of the locus. More specifically, the gesture recognition unit 14 stores recognition results of the first through the last locus in a recognition result storage buffer.

In step S77, the gesture recognition unit 14 determines whether all loci have been completely evaluated. If it is determined that all loci have been completely evaluated (YES in step S77), then the processing advances to step S78. On the other hand, if it is determined that any unprocessed locus remains (NO in step S77), then the processing returns to step S72 to process a subsequent locus.

In step S78, the gesture recognition unit 14 stores the gesture code whose degree of matching has been determined to be high during the evaluation of the locus. In the example illustrated in FIG. 6, the gesture recognition unit 14 stores the gesture code "0003", whose degree of matching with the locus of the first stroke has been determined to be 90% Then, the gesture recognition unit 14 ends the gesture recognition processing.

By executing processing illustrated in FIG. 7, a first stroke (locus), of the input loci, is usually recognized as an input gesture and a result of the gesture recognition is stored. For the other strokes, a gesture recognition result, such as "no corresponding gesture extracted" or "matching degree low" is output.

If the user does not input a correct gesture, a gesture recognition result "no corresponding gesture extracted" may be output as the gesture recognition result of all the loci. In this case, it is not useful to execute the subsequent processing. Accordingly, the information terminal 1 suspends the processing.

In the present exemplary embodiment, it is supposed that each gesture (gesture characteristic shape) registered in the gesture dictionary 15 includes only one stroke. However, the present exemplary embodiment is not limited to this. More specifically, it is also useful if a gesture characteristic shape including two strokes and a gesture characteristic shape including one stroke are mixed and registered in the gesture dictionary 15.

In this case, the following is executed as the processing in the flow chart of FIG. 7.

At first, the gesture recognition unit 14 executes the recognition processing on all the loci by using the data of one stroke registered in the gesture dictionary and stores the locus whose degree of matching is the highest and the degree of matching thereof.

Then, the gesture recognition unit 14 executes the recognition processing on a combination of two input loci by using the data of two strokes registered in the gesture dictionary. Furthermore, the gesture recognition unit 14 stores the combination of two loci whose degree of matching is the highest and the matching degree thereof.

More specifically, the gesture recognition unit 14 compares the matching degree of the two loci and the matching degree of the one locus and uses the gesture code whose matching degree is higher as the gesture recognition result.

Figure 8:
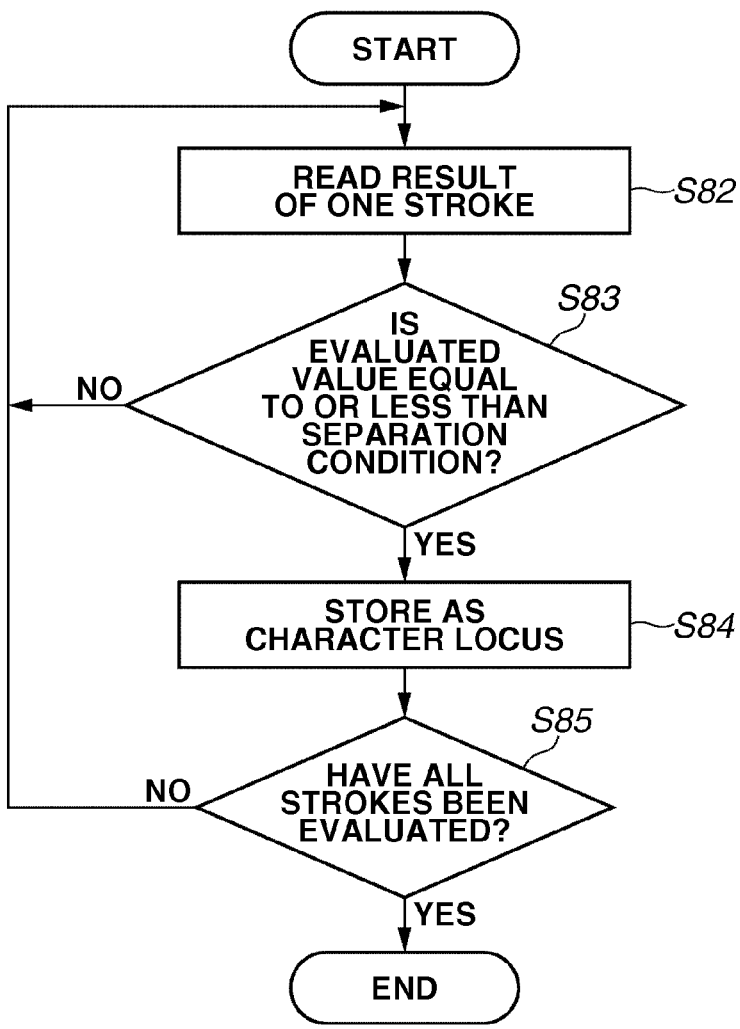
FIG. 8 is a flow chart illustrating an example of locus separation processing (case 1).

In the above-described manner, the information terminal 1 can separate two strokes or one stroke from the locus as a gesture locus (gesture locus data) according to the recognition result and the other loci (data other than the gesture locus data) as a character locus by executing locus separation processing illustrated in FIG. 8. If a gesture including three strokes, the above-described method can be applied to the gesture including three strokes.

As for a combination of loci matching with the two-stroke gesture dictionary data, if data of a locus including first through fifth strokes has been input, loci input in the vicinity of the first and the second strokes (or the second and the third strokes, the third and the fourth strokes, or the fourth and the fifth strokes) or loci at close positions in the order of input are used as a candidate of a combination.

Now, locus separation processing will be described in detail below. FIG. 8 is a flow chart illustrating an example of the locus separation processing (case 1). When the locus separation processing starts, the separation unit 16 secures a work area and initializes the work area.

Referring to FIG. 8, in step S82, the separation unit 16 reads a recognition result of one locus. More specifically, the separation unit 16 reads the recognition result illustrated in FIG. 7.

For example, if the recognition result of the first locus illustrated in FIG. 6 indicates the matching degree of 90% with the gesture code "0003", then the separation unit 16 reads the same as the recognition result.

In step S83, the separation unit 16 determines whether the evaluation value (the degree of matching) of the recognition result is equal to or less than a gesture separation condition. If it is determined that the evaluation value of the recognition result is equal to or less than the gesture separation condition (YES in step S83), then the processing advances to step S84. On the other hand, if it is determined that the evaluation value of the recognition result is greater than the gesture separation condition (NO in step S83), then the processing returns to step S82.

More specifically, if the recognition result of the locus indicates the degree of matching of 90% with gesture code "0003", since the gesture separation condition of the gesture code "0003" is the matching degree of 80% or more, the separation unit 16 returns to step S82. In other words, in this case, the separation unit 16 does not store the locus as one of the character loci.

If the recognition result indicates "no corresponding gesture code extracted", then the separation unit 16 separates the loci as character loci.

In step S84, the separation unit 16 stores the locus read in step S82 in the storage buffer as the character locus. If it is determined that data of all the character loci has been stored, then the separation unit 16 transmits the character loci to the character separation unit 18.

In step S85, the separation unit 16 determines whether all the loci have been completely processed. If it is determined that all the loci have been completely processed (YES in step S85), then the processing illustrated in FIG. 8 ends. On the other hand, if it is determined that all the loci have not been completely processed yet, then the processing returns to step S82 to read data of a subsequent locus.

Now, character locus separation processing will be described in detail below.

Figure 9:
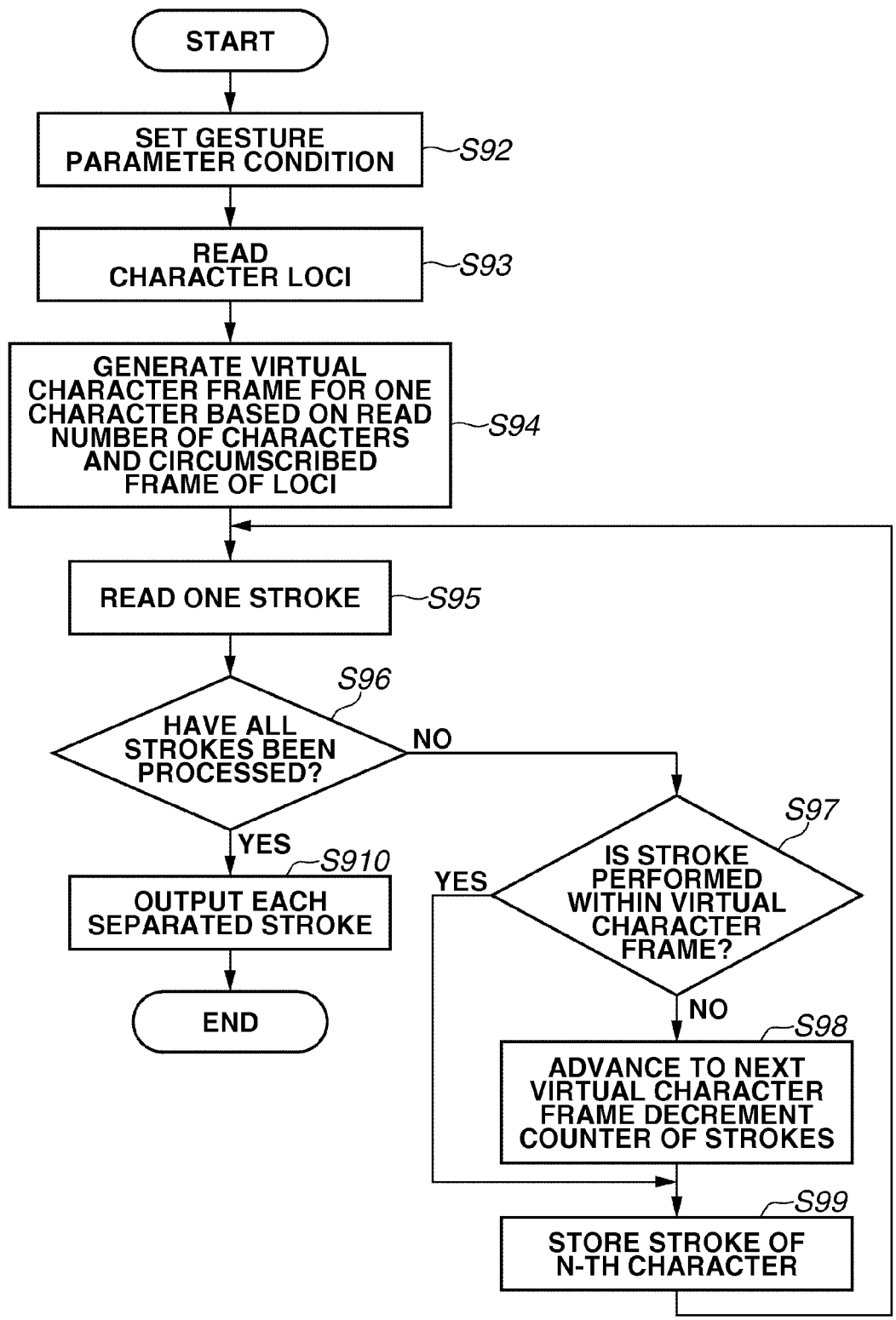
FIG. 9 is a flow chart illustrating an example of separation processing.

FIG. 9 is a flow chart illustrating an example of separation processing. The separation processing described below is, to be brief, processing for separating positional coordinate data of a character locus including a plurality of characters into positional coordinate data of each character. When the character locus separation processing starts, the character separation unit 18 secures a work area and initializes the work area.

Referring to FIG. 9, in step S92, the recognition condition setting unit 17 reads a gesture parameter condition, which is an example of conditional information, from the gesture dictionary. Then, the recognition condition setting unit 17 sets the read gesture parameter condition on the character separation unit 18.

The recognition condition setting unit 17 reads the gesture parameter condition of the corresponding gesture code from the gesture dictionary (FIG. 4) and sets the same on the character separation unit 18.

For example, if the gesture input by the user is a printing gesture, the user can designate the number of prints at the same time in inputting the printing gesture. In the present exemplary embodiment, the number of prints up to ninety-nine sheets can be designated. Accordingly, numerals of up to two digits (i.e., a numeral from 1 to 99) are set as the gesture parameter condition.

In the input example illustrated in FIG. 6, the printing size is designated by the gesture code "0003". Accordingly, the gesture parameter condition is "two-digit alphanumeric", such as "A4", "A3", or "B5". However, the present exemplary embodiment is not limited to this. More specifically, since printing on a card or a letter is conceivable, it is also useful if the gesture parameter condition includes a two-digit alphanumeric or a kanji character.

In step S93, the character separation unit 18 reads the character loci stored by the separation unit 16 in the storage buffer in the processing illustrated in FIG. 8.

In step S94, the character separation unit 18 generates a virtual character frame for one character according to the number of characters in the read gesture parameter condition and the circumscribed frame of the loci. More specifically, if the gesture code is "0003", if the gesture parameter condition is "two-digit alphanumeric", and if the character locus is "A4", then the character separation unit 18 generates two virtual character frames "☐ ☐".

In step S95, the character separation unit 18 reads one locus. More specifically, the character separation unit 18 loads a positional coordinate data row of one locus on the work area.

In step S96, the character separation unit 18 determines whether all the loci have been completely processed. If it is determined that all the loci have been completely processed (YES in step S96), then the processing advances to step S910. On the other hand, if it is determined that all the loci have not been completely processed yet (NO in step S96), then the processing advances to step S97.

In step S97, the character separation unit 18 determines whether the locus read in step S95 exists within the virtual character frame currently used. More specifically, the character separation unit 18 executes the determination serially on the virtual character frame for the first character, the virtual character frame for the second character, and so on.

If it is determined that the locus read in step S95 exists within the virtual character frame currently used (YES in step S97), then the processing advances to step S99. On the other hand, if it is determined that the locus read in step S95 does not exist within the virtual character frame currently used (NO in step S97), then the processing advances to step S98.

In the determination in step S97, at first, the character separation unit 18 separates (extracts) the character locus input in the left frame of the virtual character frames "☐ ☐" as the first character. Then, the character separation unit 18 separates (extracts) the character locus input in the right frame of the virtual character frames "☐ ☐" as the second character.

In step S98, the character separation unit 18 prepares for separating data input in a subsequent virtual character frame. More specifically, the character separation unit 18 moves the positional data of the virtual character frame so that the data is put into the right frame from the left frame and decrements the counter for the locus.

In step S99, the character separation unit 18 stores the locus data of N characters (N is an integer) obtained as a result of the character separation.

In step S910, the character separation unit 18 transmits the data of the locus of the character separated and stored character by character in step S99.

Now, an example of the character recognition processing will be described in detail below.

Figure 10:
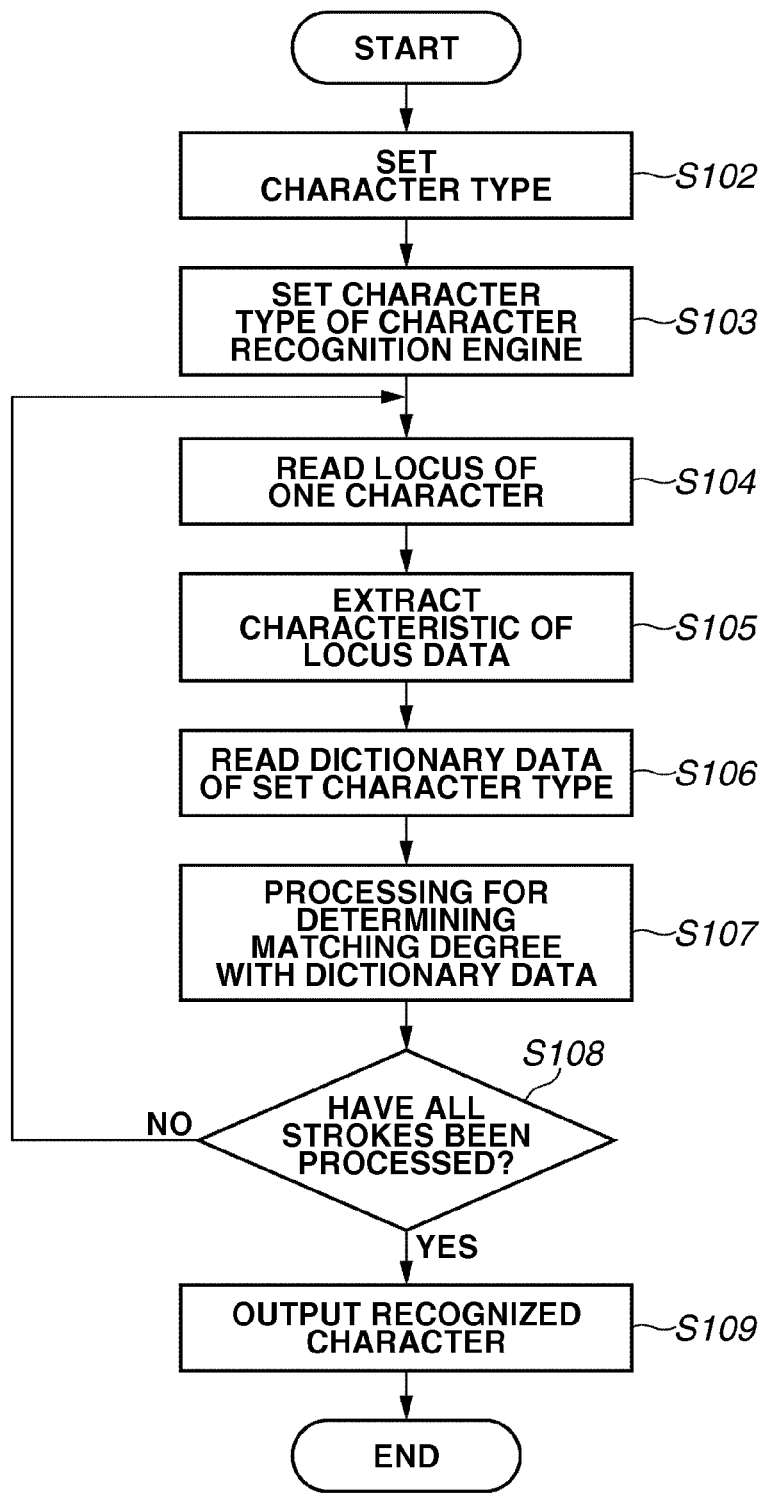
FIG. 10 is a flow chart illustrating an example of character recognition processing.

FIG. 10 is a flow chart illustrating an example of character recognition processing (processing for recognizing character locus data). When the character recognition processing starts, the character recognition unit 19 secures a work area and initializes the work area.

Referring to FIG. 10, in step S102, the recognition condition setting unit 17 reads the character type of the parameter from the gesture dictionary and sets the read parameter character type on the character recognition unit 19. More specifically, in the input example illustrated in FIG. 6, because the gesture code is "0003", the recognition condition setting unit 17 reads "alphanumeric" as the character type and sets the read character type on the character recognition unit 19.

In step S103, the character recognition unit 19 executes a setting of the character type for a character recognition engine. In the example illustrated in FIG. 6, the character recognition unit 19 sets "alphanumeric" on the character recognition engine as the character type. By executing the above-described processing, the character recognition dictionary includes only alphanumeric.

In step S104, the character recognition unit 19 loads the locus for one character on the work area. In step S105, the character recognition unit 19 extracts the characteristic data of the locus data. More specifically, the character recognition unit 19 equally divides one locus into ten parts and converts the equally divided loci into vector data in eight directions.

In step S106, the character recognition unit 19 reads the dictionary data of the set character type from the character recognition dictionary. For example, if "alphanumeric" is set as the character type, the character recognition unit 19 reads only the alphanumeric dictionary data from the character recognition dictionary.

In step S107, the character recognition unit 19 executes matching processing between the characteristic data of the locus data and the locus characteristic data of the character included in the dictionary data of the character recognition dictionary. Then, the character recognition unit 19 sets the character code of the dictionary locus characteristic data whose matching degree is the highest as the recognition result.

In step S108, the character recognition unit 19 determines whether all the character loci have been completely processed. If it is determined that all the character loci have been completely processed (YES in step S108), then the processing advances to step S109. On the other hand, if it is determined that all the character loci have not been completely processed yet (NO in step S108), then the processing returns to step S104.

Figure 11:
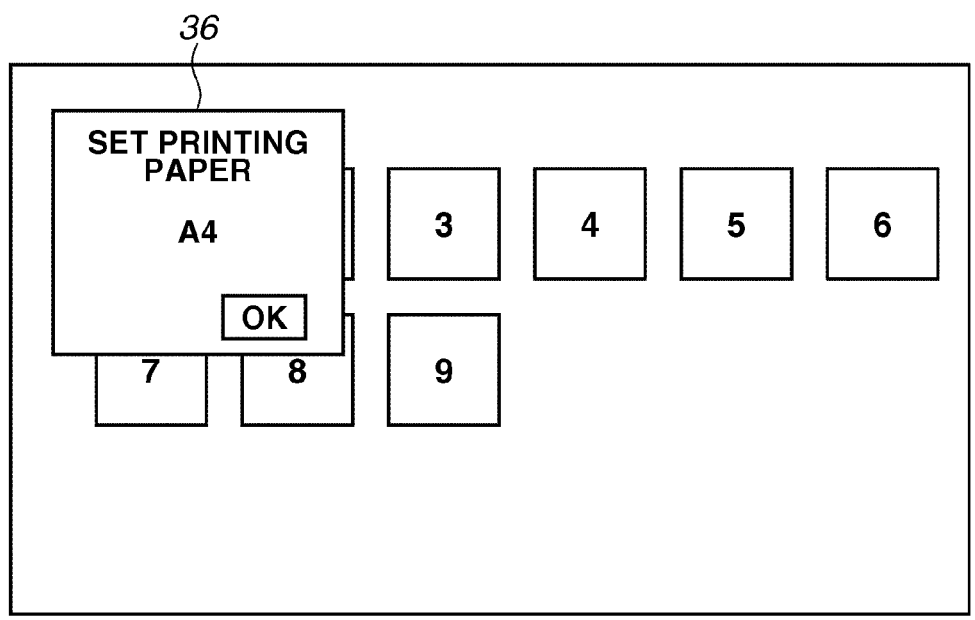
FIG. 11 illustrates an example of a screen that displays a result of gesture recognition (case 1).

In step S109, the character recognition unit 19 executes processing for outputting the character code of the recognized character to the command processing unit 21 as the recognition result. FIG. 11 illustrates an example of a screen that displays a result of gesture recognition (case 1).

When the locus illustrated in FIG. 5 is input by the user, if the gesture of the command to set the printing size is recognized by the gesture recognition unit 14, and if the printing size "A4" is recognized by the character recognition unit 19, then the command processing unit 21 displays the screen illustrated in FIG. 11 on the LCD device 7.

The screen displayed in the example illustrated in FIG. 11 is a mere example. More specifically, it is also useful if font characters display the printing size "A4" and an icon indicating the locus or the command displays the gesture. In addition, it is also useful if the command processing unit 21 displays another candidate (changes the printing size "A4" to "B4" for display) when the user presses each character or an icon with the pen 2.

The information terminal 1 according to the present exemplary embodiment and having the above-described configuration executes the above-described processing. As a result, the present exemplary embodiment can appropriately separate, recognize, and process a hand-drawn gesture locus and a character locus input on a free flat plane area including no frame, in a free order.

Furthermore, by executing the above-described processing, the information terminal 1 can appropriately separate and recognize the gesture locus and the character locus regardless of the order of inputting the same (whether the gesture locus and the character locus are input in this order, input in the order of the character locus and the gesture locus, or input in the order of character locus, gesture locus, and character locus).

Now, a second exemplary embodiment will be described in detail below. In the above-described first exemplary embodiment, because a gesture has a specific shape and is input by a particular way of inputting, the information terminal 1 separates the gesture locus and the character locus, which is the gesture command parameter, according to a result of the gesture recognition. However, according to the type of units and devices mounted on the information terminal 1, an exemplary embodiment is conceivable that uses a locus having the same shape as a normally written character, as a gesture.

The present exemplary embodiment includes a positional condition determination unit, which is configured to determine a condition of the position between the gesture locus and other loci, in addition to the first exemplary embodiment.

Figure 12:
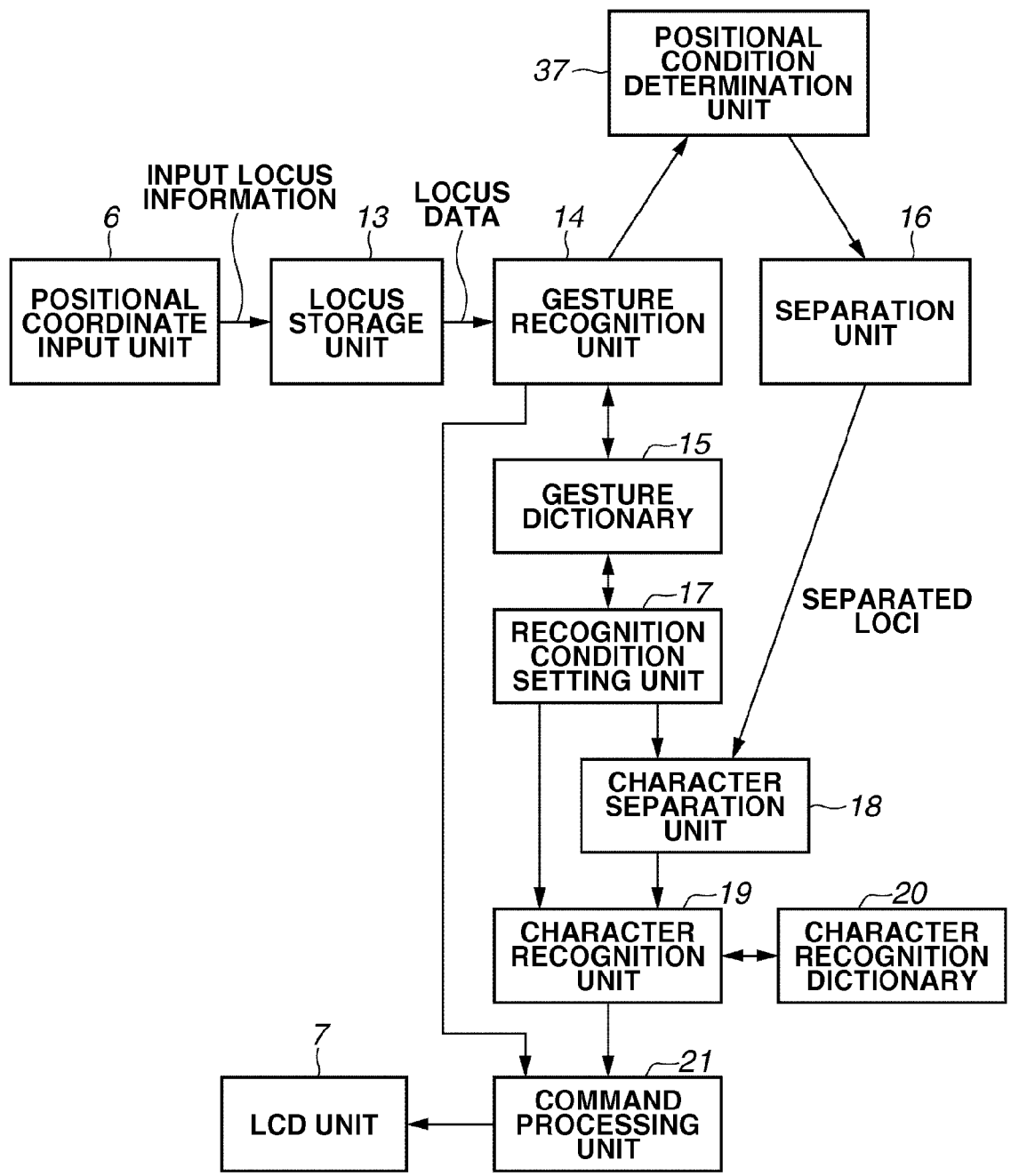
FIG. 12 illustrates an exemplary functional configuration of an information terminal 1 (case 2).

FIG. 12 illustrates an exemplary functional configuration of an information terminal 1 (case 2). In the following description, points different from the first exemplary embodiment will be primarily described in detail below.

Referring to FIG. 12, a positional condition determination unit 37 determines whether a corresponding gesture locus satisfies a positional condition recorded in the gesture dictionary.

FIG. 13 illustrates an example of a structure of data of a gesture dictionary (case 2). One piece of gesture dictionary data includes a gesture code, a gesture characteristic shape (characteristic data of the gesture shape), a gesture parameter condition, a gesture separation condition, a command type, and data of a positional condition.

In the present exemplary embodiment, a "positional condition" refers to a positional condition between a position of a gesture locus and the position of a character locus, which is a gesture command parameter input at the same time in inputting the gesture locus.

If a gesture code is "0002", the positional condition includes a positional condition for inputting a parameter character locus within the gesture locus.

If a character such as "oo", is registered in the dictionary, it is useful if a detailed condition is stored such that a locus of two strokes or more is to be included or if a detailed condition as to the shape of the locus is stored.

Figure 14:
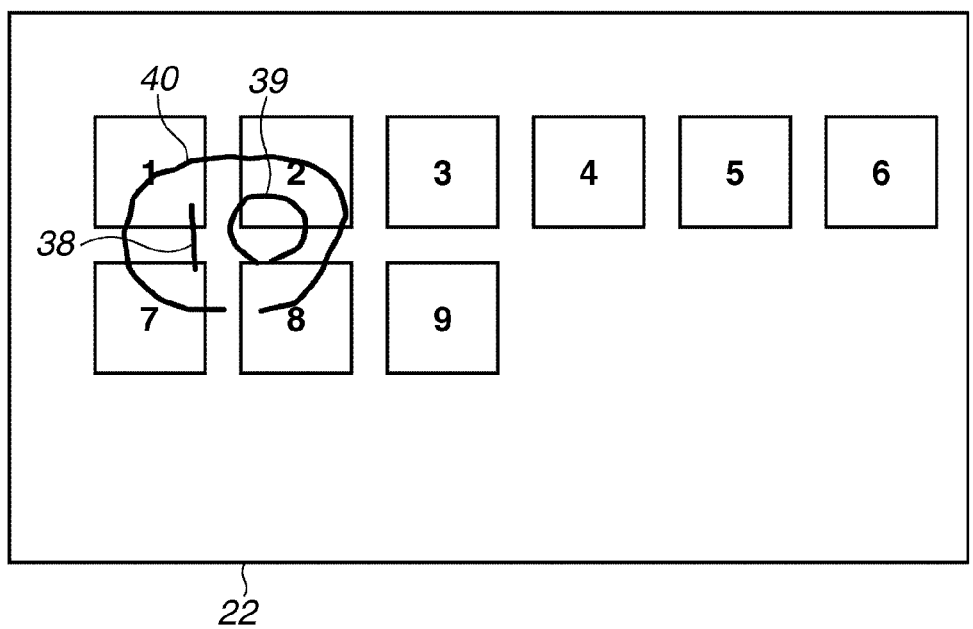
FIG. 14 illustrates an example of a locus of input data (case 2).

FIG. 14 illustrates an example of a locus of input data (case 2). Referring to FIG. 14, the display input screen 22 displays a first stroke locus 38, a second stroke locus 39, and a third stroke locus 40.

Figure 15:
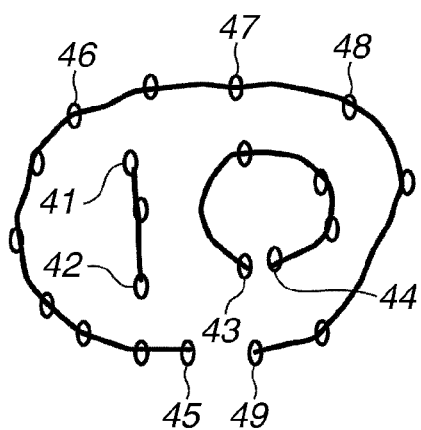
FIG. 15 illustrates an example of locus data (case 2).
Figure 16:
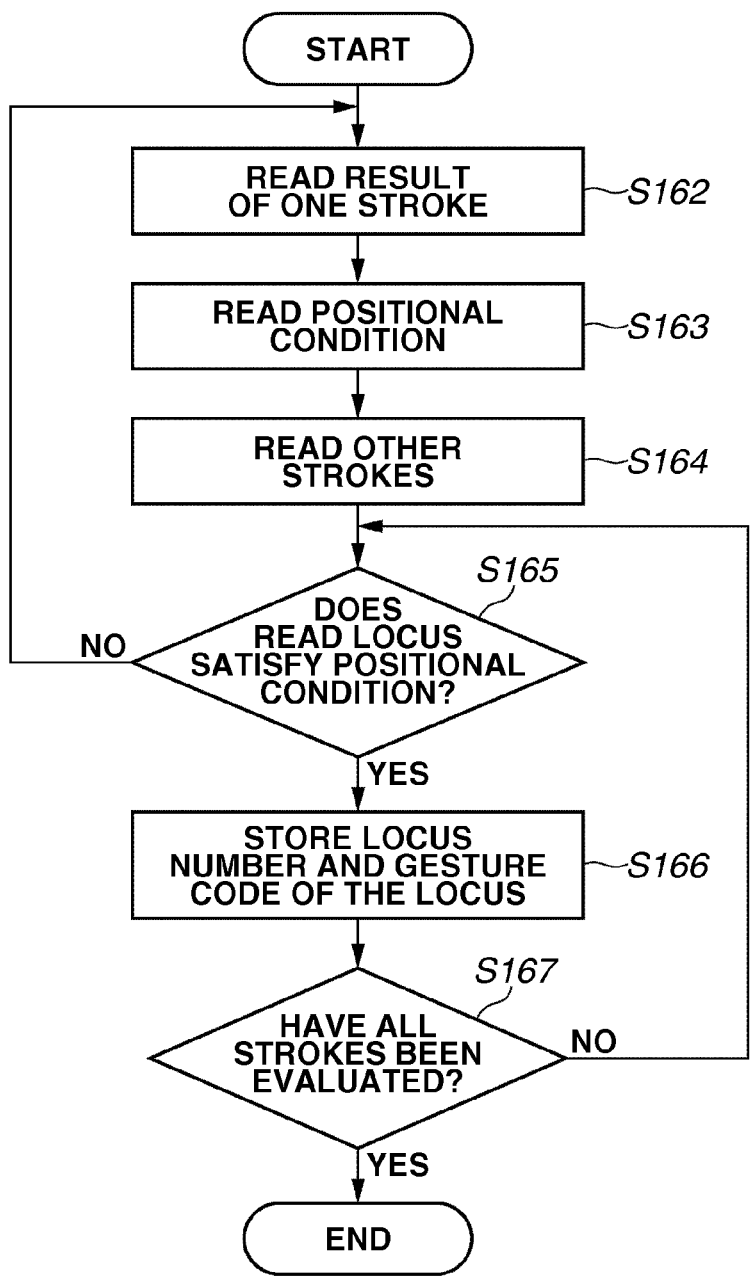
FIG. 16 is a flow chart illustrating an example of positional condition determination processing.

FIG. 15 illustrates an example of locus data (case 2). FIG. 16 is a flow chart illustrating an example of positional condition determination processing. In the present exemplary embodiment, it is supposed that before the processing illustrated in FIG. 16 starts (before the processing illustrated in FIG. 16 is called), the gesture recognition processing by the gesture recognition unit 14 has been completed.

When the positional condition determination processing starts, the positional condition determination unit 37 secures a work area and initializes the work area.

Referring to FIG. 16, in step S162, the positional condition determination unit 37 loads the result of one locus on the work area. More specifically, in the example illustrated in FIG. 14, the positional condition determination unit 37 reads the gesture code "0002", which indicates the locus 40.

In step S163, the positional condition determination unit 37 reads the positional condition from the gesture dictionary according to the read gesture code. If it is recognized that the locus 40 is the gesture code "0002", then the positional condition determination unit 37 reads the positional condition such that the character locus, which is the positional condition of the gesture code "0002", exists within the gesture locus. In step S164, the positional condition determination unit 37 reads the other loci on an inspection work area.

In step S165, the positional condition determination unit 37 determines whether all the loci read in step S164 satisfy the positional condition read in step S163. If it is determined that all the loci read in step S164 satisfy the positional condition read in step S163 (YES in step S165), then the processing advances to step S166. On the other hand, if it is determined that all the loci read in step S164 do not satisfy the positional condition read in step S163 (NO in step S165), then the processing advances to step S167.

In the example illustrated in FIG. 14, the positional condition determination unit 37 reads a condition such that if the recognition result of the locus 40 having a circular locus "○" as an outer locus is the gesture code "0002", then the character locus of the gesture command parameter exists within the gesture locus.

In this case, the first stroke locus "1" 38 and the second stroke locus "0" 39 is input within the outer circular locus 40. Accordingly, the positional condition determination unit 37 determines that all the loci read in step S164 satisfy the positional condition read in step S163.

On the other hand, the recognition result of the second stroke locus "0" 39 is the gesture code "0002" but both the first and the third strokes are input outside the second stroke locus "0" 39. Accordingly, the positional condition determination unit 37 determines that the positional condition is not satisfied.

In step S166, the positional condition determination unit 37 stores the locus number of the locus that satisfies the positional condition and the gesture code thereof. In step S167, the positional condition determination unit 37 determines whether all the loci have been processed.

If it is determined that all the loci have been processed (YES in step S167), then the positional condition determination unit 37 outputs the locus number and the gesture code of the locus that has been determined to satisfy the positional condition stored in step S166. Then, the processing illustrated in FIG. 16 ends.

On the other hand, if it is determined that all the loci have not been processed yet (NO in step S167), then the processing returns to step S162.

Figure 17:
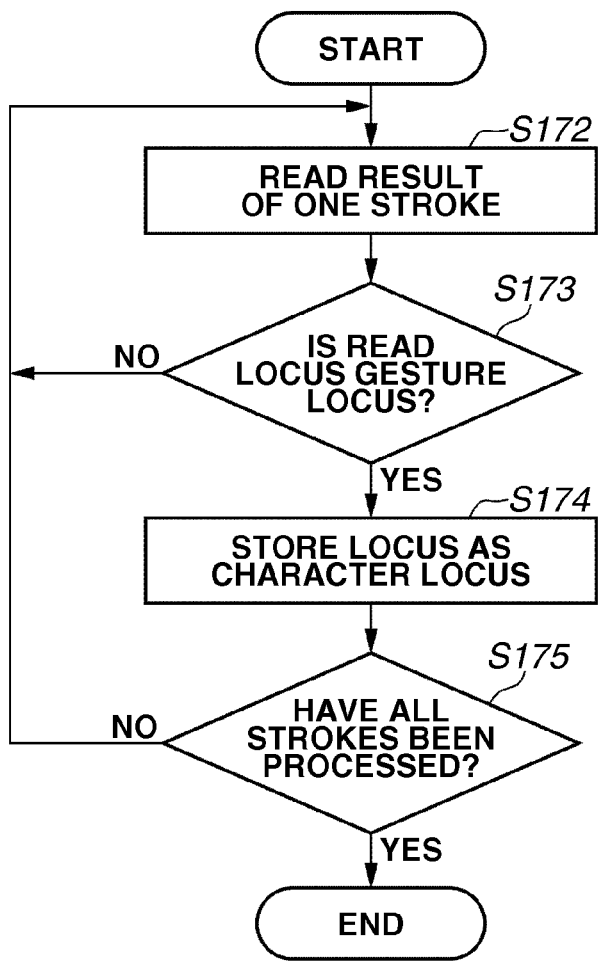
FIG. 17 is a flow chart illustrating an example of locus separation processing (case 2).

FIG. 17 is a flow chart illustrating an example of locus separation processing (case 2). When the locus separation processing starts, the separation unit 16 secures a work area and initializes the work area.

Referring to FIG. 17, in step S172, the separation unit 16 reads a recognition result of one locus. The recognition result of one locus is a recognition result after the positional condition determination processing is executed.

For the first stroke locus "1" 38, no corresponding gesture exists. Accordingly, no corresponding gesture code exists. For the second stroke locus "0" 39, no corresponding gesture code exists because the positional condition is not satisfied.

For the third stroke locus "0" 40, the corresponding gesture code "0002" exists because the positional condition is satisfied.

In step S173, the locus that the separation unit 16 determines whether the locus read in step S172 is a gesture locus. If it is determined that the locus read instep S172 is a gesture locus (YES in step S173), then the processing advances to step S172. On the other hand, if it is determined that the locus read in step S172 is not a gesture locus (NO in step S173), then the processing advances to step S174.

In step S174, the separation unit 16 stores the locus read in step S172 in the storage buffer as the character locus. More specifically, in the example illustrated in FIG. 14, the positional condition determination unit 37 stores the first and second loci "10" as the character locus, as the result of the gesture recognition and the result of the determination as to whether the locus satisfies the positional condition.

In step S175, the separation unit 16 determines whether all the loci have been completely processed. If it is determined that all the loci have been completely processed (YES instep S175), then the processing illustrated in FIG. 17 ends. On the other hand, if it is determined that all the loci have not been completely processed yet (NO in step S175), then the processing returns to step S172 to process a subsequent locus. After that, the processing similar to that in the first exemplary embodiment is executed.

Figure 18:
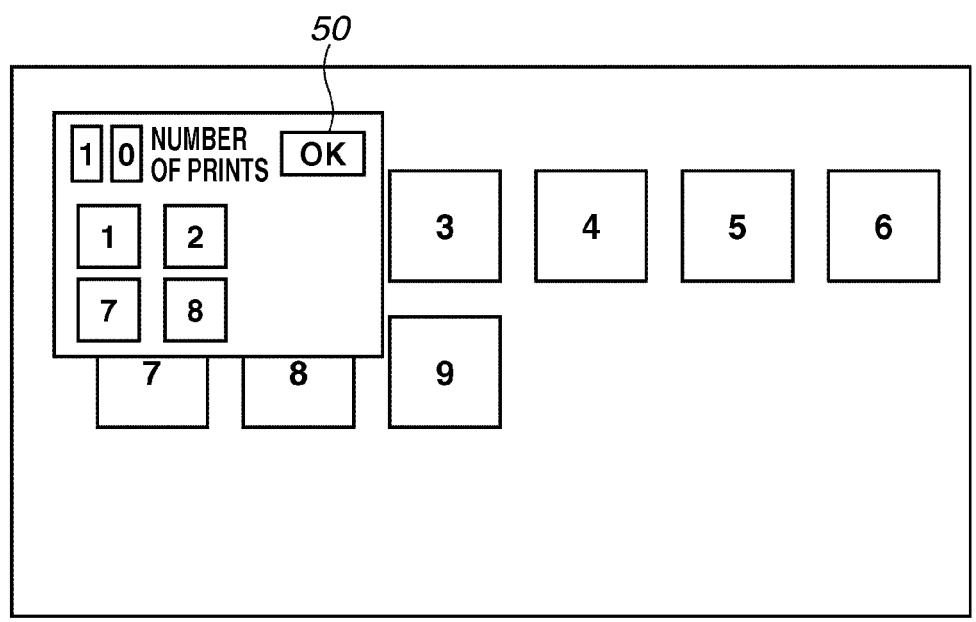
FIG. 18 illustrates an example of a screen displayed as a result of gesture recognition (case 2).

If the combination of the loci "1", "0", and "○" 38 through 40 illustrated in FIG. 14 are recognized as an instruction for printing ten sheets, then the command processing unit 21 displays a screen (verification screen) 50 illustrated in FIG. 18 on the liquid crystal display (LCD) device 7.

FIG. 18 illustrates an example of a screen displayed as a result of the gesture recognition (case 2).

The information terminal 1 according to the present exemplary embodiment and having the above-described configuration executes the above-described processing. Accordingly, the present exemplary embodiment can appropriately determine whether an input locus is a gesture locus or a character locus according to the positional condition even if the gesture and the character have the same locus.

More specifically, the present exemplary embodiment can appropriately separate a gesture locus and a character locus even if the loci are input at the same time. Therefore, the present exemplary embodiment can appropriately execute recognition processing.

With the above-described configuration, the present exemplary embodiment can allow the user to freely set the shape of a gesture to be registered. Accordingly, the present exemplary embodiment can realize the information terminal 1, on which a shape that the user can easily input or a locus by whose shape the user can easily think of the type of the corresponding command can be registered.

The present invention can also be achieved by providing a system or an apparatus with a storage medium storing program code of software implementing the functions of the embodiments and by reading and executing the program code stored in the storage medium with a computer of the system or the apparatus (a CPU or a micro processing unit (MPU)).

In this case, the program code itself, which is read from the storage medium, implements the functions of the embodiments described above, and accordingly, the storage medium storing the program code constitutes the present invention.

In addition, the functions according to the embodiments described above can be implemented not only by executing the program code read by the CPU of the system or the computer, but also implemented by the processing in which an OS or the like carries out a part of or the whole of the actual processing based on an instruction given by the program code.

Further, in another aspect of the embodiment of the present invention, after the program code read from the storage medium is written in a memory provided in a function expansion board inserted in the system or the computer or a function expansion unit connected to the system or the computer, a CPU and the like provided in the function expansion board or the function expansion unit carries out a part of or the whole of the processing to implement the functions of the embodiments described above.

If the present invention is applied on the storage medium, the program code corresponding to the above-described flowcharts is stored on the storage medium (computer-readable storage medium).

With the above-described configuration, each of the above-described exemplary embodiments of the present invention can recognize each of loci input by the user in an arbitrary order and execute processing according to an instruction indicated by the loci.

Each exemplary embodiment of the present invention having the configuration described above can increase the separation ratio and the recognition ratio of the character locus according to the relationship between the gesture locus and the character locus input at the same time in inputting the gesture locus.

In addition, the second exemplary embodiment can separate the loci having the same shape owing to the setting of the condition for the positional relationship between the gesture locus and the gesture command parameter character locus. Therefore, the present invention can increase the user convenience.

Furthermore, if only one-stroke locus is registered in the gesture dictionary as a gesture locus, the size of the dictionary can be reduced and the processing can be executed at a high processing speed.

With the above-described configuration, each exemplary embodiment of the present invention described above can appropriately separate a gesture locus and a character locus from loci wherein a gesture locus and a character locus are mixed, within a practical processing time.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-334758 filed Dec. 26, 2008, which is hereby incorporated by reference herein in its entirety.

What is claimed is:

1. An information processing apparatus comprising:
   an acquisition unit configured to acquire locus data;
   a first recognition unit configured to recognize gesture locus data included in a part of the acquired locus data according to the acquired locus data and gesture shape data included in gesture dictionary data;
   a separation unit configured to separate gesture locus data and locus data other than the gesture locus data from the acquired locus data according to a result of the recognition by the first recognition unit;
   a second recognition unit configured to recognize the locus data other than the gesture locus data based on condition information associated with the gesture locus data as the result of the recognition by the first recognition unit and information of a character included in character dictionary data.

2. The information processing apparatus according to claim 1, further comprising:
a character separation unit configured to separate the locus data other than the gesture locus data separated by the separation unit up to a number of characters as an upper limit value, into locus data of one character one by one, the condition information including the number of characters of the locus data other than the gesture locus data separated by the separation unit,
wherein the second recognition unit is configured to recognize locus data of each character included in the locus data other than the gesture locus data according to locus data of each of the one character separated by the character separation unit and information of the character included in the character dictionary data.

3. The information processing apparatus according to claim 1, wherein the locus data acquired by the acquisition unit is written in a free plane without a frame in free order.

4. The information processing apparatus according to claim 1, further comprising a determination unit configured to determine whether the gesture locus data recognized by the first recognition unit and the locus data other than the gesture locus data satisfy a positional condition between the gesture locus data related to the gesture locus data included in the locus data used in the recognition processing by the first recognition unit and the locus data other than the gesture locus data, wherein the separation unit is configured, if it is determined by the determination unit that the positional condition is satisfied, to separate gesture locus data and locus data other than the gesture locus data from the locus data.

5. A locus data recognition method in an information processing apparatus, the locus data recognition method comprising:
acquiring locus data;
recognizing gesture locus data included in a part of the acquired locus data according to the acquired locus data and gesture shape data included in gesture dictionary data;
separating gesture locus data and locus data other than the gesture locus data from the acquired locus data according to a result of the recognition;
recognizing characteristic data of the separated locus data other than the gesture locus data based on condition information associated with the gesture as the result of the recognition and information of a character included in character dictionary data.

6. The locus data recognition method according to claim 5, further comprising:
setting information about a recognition condition;
separating the locus data other than the gesture locus data up to a number of characters set as an upper limit value into locus data of one character one by one; and
recognizing locus data of each character included in the locus data other than the gesture locus data according to locus data of each of the separated one character and information of the character included in the character dictionary data.

7. The locus data recognition method according to claim 6, further comprising setting the number of characters according to conditional information for the gesture locus data.

8. The locus data recognition method according to claim 5, further comprising:
determining whether the recognized gesture locus data and the locus data other than the gesture locus data satisfy a positional condition between the gesture locus data related to the gesture locus data included in the locus data used in the gesture locus data recognition and the locus data other than the gesture locus data; and
separating, if it is determined in the determination that the positional condition is satisfied, gesture locus data and locus data other than the gesture locus data from the locus data.

9. A non-transitory computer-readable storage medium storing instructions which, when executed by a computer, cause the computer to function as:
an acquisition unit configured to acquire locus data;
a first recognition unit configured to recognize gesture locus data included in a part of the acquired locus data according to the acquired locus data and gesture shape data included in gesture dictionary data;
a separation unit configured to separate gesture locus data and locus data other than the gesture locus data from the acquired locus data according to a result of the recognition by the first recognition unit;
a second recognition unit configured to recognize the locus data other than the gesture locus data separated by the separation unit based on condition information associated with the gesture locus data as the result of the recognition by the first recognition unit and information of a character included in a character dictionary data.

* * * * *